UNITED STATES PATENT OFFICE.

PAUL JULIUS, OF LUDWIGSHAFEN, GERMANY, ASSIGNOR TO BADISCHE ANILIN & SODA FABRIK, OF SAME PLACE.

DISAZO DYE.

SPECIFICATION forming part of Letters Patent No. 677,231, dated June 25, 1901.

Application filed March 19, 1901. Serial No. 51,858. (No specimens.)

*To all whom it may concern:*

Be it known that I, PAUL JULIUS, doctor of philosophy and chemist, a subject of the Emperor of Austria-Hungary, residing at Ludwigshafen-on-the-Rhine, in the Kingdom of Bavaria, Germany, have invented new and useful Improvements in New Azo Dyes, of which the following is a specification.

In the specification of United States Letters Patent No. 665,696, dated January 8, 1901, the production of a dye has been described from one molecular proportion of the tetrazo compound obtained upon diazotizing ortho-ortho-diamido-phenol-para-sulfo-acid and one molecular proportion of beta-naphthol. The combination is effected in the presence of caustic soda and is soon complete. The coloring-matter obtained dyes wool from the acid-bath red-brown shades, which upon treatment with potassium bichromate turn violet-black. It is readily soluble in water, the solution being violet, which solution turns red on the addition of hydrochloric acid. I have discovered that if the same tetrazo compound be treated with two molecular proportions of beta-naphthol sodium, preferably in carbonate-of-soda solution, a new blue coloring-matter is obtained; but the combination of the tetrazo compound with the two molecular proportions of beta-naphthol takes place exceedingly slowly at ordinary temperature, and even at a temperature of forty (40°) degrees centigrade the reaction cannot be considered complete before the lapse of hours. My new coloring-matter dyes wool from the acid-bath brownish-violet shades, which turn deep-blue black upon treatment with potassium bichromate. It is difficulty soluble in water—for instance, on boiling up one (1) part of my coloring-matter with four hundred (400) parts of water, cooling the liquid and pouring it through a good filter capable of retaining fine precipitates, it can be seen that a considerable portion of the said coloring-matter is undissolved. The color of the dye in water is blue, and on the addition of hydrochloric acid to the sufficiently-concentrated solution or suspension a violet precipitate is formed.

The following example will illustrate the manner in which my invention can be carried into practical effect, but I do not confine myself to the details therein given, the parts being by weight:

Example: Prepare a solution of two hundred and four (204) parts of ortho-ortho-diamido-phenol-para-sulfo-acid (one molecular proportion) in four hundred and sixty (460) parts of hydrochloric acid (containing about thirty-two per cent. of real HCl) and five thousand (5,000) parts of water. Stir the solution and run in one hundred and thirty-eight (138) parts of sodium nitrite dissolved in four hundred (400) parts of water. As the diazotation proceeds the tetrazo compound separates out in part in the form of crystals. The solution or suspension of the tetrazo compound thus obtained is then poured into a solution of two hundred and ninety (290) parts of beta-naphthol (two molecular proportions) dissolved in two thousand five hundred (2,500) parts of water and two hundred and forty (240) parts of caustic-soda lye (containing about thirty-five per cent. of NaOH) and the quantity of carbonate of soda necessary to neutralize the acid. Stir the mixture for about three (3) or four (4) hours at a temperature of about forty (40°) degrees centigrade. Then boil the reaction mass and collect the disazo coloring-matter thus obtained by filtering, pressing, and drying. The coloring-matter is so little soluble in water that as a rule it is unnecessary to add common salt in order to precipitate it.

Now what I claim is—

The new disazo coloring-matter which can be obtained from one molecular proportion of ortho-ortho-diamido-phenol-para-sulfo-acid and two molecular proportions of beta-naphthol which is difficultly soluble in water yielding on mixture therewith a blue solution or suspension, which on addition of hydrochloric acid yields a violet precipitate, and which dyes wool from the acid-bath brownish-violet shades, which turn deep-blue black upon treatment with potassium bichromate, substantially as described.

In testimony whereof I have hereunto set my hand in the presence of two subscribing witnesses.

PAUL JULIUS.

Witnesses:
ERNEST F. EHRHARDT,
JOHN L. HEINKE.